United States Patent Office 3,497,486
Patented Feb. 24, 1970

3,497,486
PROCESS FOR PRODUCING SOLID HOMOPOLY-
MERS OF 2-PHENYL ALLYL ALCOHOL BY PO-
LYMERIZATION WITH AZO CATALYST
Marc O. Thienot, Park Forest, Ill., and Joseph A. Verdol,
White Plains, N.Y., assignors to Sinclair Oil Corpora-
tion, New York, N.Y., a corporation of New York
No Drawing. Continuation-in-part of application Ser. No.
518,550, Jan. 4, 1966. This application Dec. 3, 1968,
Ser. No. 780,919
Int. Cl. C08f 3/36, 1/78
U.S. Cl. 260—91.3                                6 Claims

ABSTRACT OF THE DISCLOSURE

Solid homopolymers of 2-phenyl allyl alcohol are pre-
pared by polymerizing 2-phenyl allyl alcohol in bulk or
dispersed in water, at a temperature of about 40 to 70°
C., preferably at about 50 to 65° C., in the presence of
an azo catalyst, such as alpha,alpha′-azobisisobutyro-
nitrile. This process produces solid homopolymers of 2-
phenyl allyl alcohol having a final melting point of about
200 to 250° C. and an average molecular weight of at
least about 1100. The optical properties and high melt-
ing point of these homopolymers make them useful as a
substitute for glass.

---

This is a continuation-in-part of our copending appli-
cation Ser. No. 518,550, filed Jan. 4, 1966, and now
abandoned.

This invention is directed to the preparation of homo-
polymers of 2-phenyl-allyl alcohol having a high melting
point. Although interest has been displayed in allyl type
monomers as a means for producing vinyl and related
polymers having additional functionalities, the allyl type
monomers are difficult to polymerize because of the in-
herent characteristics of the allyl grouping, and as such
have found little use commercially. It has now been found
that the presence of a phenyl group in the "2" position
of allyl alcohol sufficiently changes the polymerization
characteristics of the allyl monomer to permit it to
homopolymerize to a high melting point polymer under
selected polymerization conditions.

The polymers made by the process of the invention are
solids having a final melting point of about 200 to 250° C.
(as measured at atmospheric pressure on a Fisher-Johns
melting point apparatus) and an average molecular
weight of at least about 1110 to 1500, often up to about
4000 or more. The polymers will generally begin melt-
ing at a tempearture of about 190° to 240° C. and often
will reach their final melting point temperature anywhere
within about a 2° C. to 25° C. unit increase of tempera-
ture. The determination of average molecular weight as
used herein is made by the thermoelectric differential
vapor pressure lowering method on a Mechrolab osmom-
eter. This instrument operates by measuring temperature
transfer between a sample drop of test solution and a
reference drop of pure solvent. Each drop surrounds a
small bead thermistor mounted in a thermostat chamber
saturated with solvent vapor.

The polymers are insoluble in most organic solvents
but soluble in dimethylformamide. The optical properties
and high melting point of these polymers make them use-
ful as a substitute for glass. The polymers may also be
used for the preparation of a number of derivatives to
form useful products. A good example is the prepara-
tion of surface-active agents which would include de-
mulsifiers and emulsifiers prepared by oxyalkylation of
the polymers. 2-phenyl-allyl alcohol may be made by
suitable methods, for example, as disclosed in U.S. Pat-
ent 2,537,622 and the compound may have substituents
which are not deleterious in the reaction or in the uses
of the polymer product.

In accordance with the method of the present invention,
2-phenyl-allyl alcohol is polymerized in bulk or as a
suspension in water, in the presence of an azo type cat-
alyst. Temperatures employed for the polymerization are
usually about 40° to 70° C., preferably about 50° to 65°
C. Polymerization conversion decreases, however, at tem-
peratures higher than about 65° C. The concentration of
the catalyst may vary with the temperature selected,
the particular type of polymerization, i.e. bulk or sus-
pension polymerization, but in all cases will be in catalyti-
cally effective amounts to produce the solid, high melt-
ing point homopolymers of 2-phenyl allyl alcohol. Gen-
erally, the catalyst concentrations will fall in the range
of about 0.5 to 10%, preferably about 1 to 5% or less by
weight of the monomer. Tne reaction can be permitted
to run to completion, for instance, for a period of over
20 hours. The aqueous suspension polymerization system
may contain a suspending agent, e.g. polyvinyl alcohol,
which is employed in small effective amounts, usually
about 0.2 to 5% by weight of the monomer. The concen-
tration of monomer in the water-monomer mixture is
usually about 10 to 60%, preferably about 30 to 35% by
weight.

The azo type catalysts employed in the polymerization
of the present invention are the symmetrical azo com-
pounds having an azo group, —N=N—, bonded from
each of the nitrogen atoms to tertiary carbon atoms. The
azo compounds can be represented by the structure:

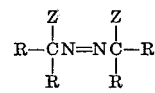

wherein R is an aliphatic, including cycloaliphatic, hydro-
carbon of up to about 11 carbon atoms with the total
carbon atoms on each side of the azo group being pref-
erably about 4 to 11 and Z is selected from the group
consisting of —CN,

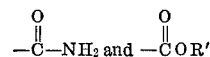

wherein R′ is lower alkyl, say of 1 to 6 carbon atoms.
R in the structural formula may be saturated or unsat-
urated, straight or branched chain, and is preferably alkyl,
such as lower alkyl of 1 to 6 carbon atoms. The preferred
catalysts are the alpha,alpha′-azobis(alkanenitriles).

Illustrative of suitable azo type catalysts are alpha,alpha′-azodiisobutyronitrile,
alpha,alpha′-azobis(alpha,gamma-dimethyl-
  valeronitrile),
alpha,alpha′-azobis(alphamethylbutyronitrile),
alpha,alpha′-azobis(alphaethylbutyronitrile),
alpha,alpha′-azobis(alpha-phenylpropionitrile),
alpha,alpha′-azobis(alpha-cyclopropylpropionitrile),
alpha,alpha′-azobis(alpha-cyclohexylpropionitrile),
alpha,alpha′-azobis(alpha-cycloheptylpropionitrile),
alpha,alpha′-azobis(alpha-isopropyl-beta-methyl-
  butyronitrile),
alpha,alpha′-azobis(alpha,gamma-dimethyl-
  capronitrile),
alpha,alpha′-azobis(alpha-n-butyl-capronitrile),
alpha,alpha′-azobis(alpha-isobutyl-gamma-methyl-
  valeronitrile),
alpha,alpha′-azobis(alpha-methyl-gamma-carboxy-
  butyronitrile)

and its salts, e.g., disodium gamma, gamma′-azobis-
(gamma - cyano - valerate), 1,1′-azodicyclohexanecar-
bonitrile, 1,1′ - azodicycloheptanecarbonitrile, 1,1″-azobis(3 - methyl - cyclopentanecarbonitrile), 1,1' - azobis (2,4 - dimethylcyclohexane-carbonitrile), and the corresponding amides and esters of the above in which the nitrile group or groups are replaced by amide and/or ester groups, e.g., to give alpha,alpha'-azodiisobutyramide, alpha,alpha'-azobis(alpha,gamma - dimethylvaleramide), alpha,alpha' - azobis(alpha - cyclopropylpropionamide), 1,1' - azodicyclohexane - carbonamide, N,N'-alpha,alpha'-azodiisobutyrodimethylamide, dimethyl, diethyl and dihexyl-alpha,alpha'-azodiisobutyrate.

The homopolymer of the invention can be recovered from the resulting solid reaction products by dissolving the reaction products in a ketonic solvent, such as methylethylketone, and precipitating the desired homopolymer by the addition of a lower alkanol, preferably methanol. The homopolymer product can then be dried to constant weight.

The following examples are included to illustrate methods of preparing the homopolymers of the invention.

EXAMPLE I

Tubes containing 2-phenyl-allyl alcohol and alpha, alpha'-azobisisobutyronitrile as a catalyst were flushed with nitrogen and sealed. The amounts of monomer and concentrations of catalyst are shown in Table I below, runs No. 1–4. The tubes were heated at 80° C. for 12 hours or at 60° C. for 65 hours. There was very little reaction at 80° C. The resulting solid products prepared in runs 3 and 4 were dissolved in methylethylketone and the desired homopolymers precipitated by addition of methanol. Each of the precipitated homopolymers was dried to constant weight in vacuo at 90–100° C. The results of the runs are summarized in Table I below.

The results of numerous bulk polymerization runs to homopolymerize 2-phenyl allyl alcohol with benzoyl peroxide, lauroyl peroxide, tertiary butyl hydroperoxide, cumene hydroperoxide and dicumyl peroxide are summarized in Table I, runs 5–17. In these runs, the temperature varied from 60° C. to 125° C. in accordance with the decomposition temperature of the catalysts. Benzoyl peroxide at 80° C. gave syrupy, low molecular weight polymers which were recovered by vacuum distillation of the reaction mixtures. At 60° C., with benzoyl peroxide, very little or no reaction took place. Lauroyl peroxide at 60° C. likewise gave little or no polymeric product.

TABLE 1.—BULK HOMOPOLYMERIZATION OF 2-PHENYL ALLYL ALCOHOL

| Run No. | Moles 2 PAA | Nature and concentration of initiator | Wt. percent | Reaction Temp., °C. | Reaction Time, hours | Polymer yield, wt. percent | Hydroxyl value, meq./gm., found/calcul. | M.W., V.P., diff. | Melting range θ, softening point, initial melting point, final melting point, °C. |
|---|---|---|---|---|---|---|---|---|---|
| 1 | 0.0745 | VAZO [1] | 1.0 | 80 | 12 | ([2]) | | | |
| 2 | 0.0745 | VAZO [1] | 5.0 | 80 | 12 | ([2]) | | | |
| 3 | 0.40 | VAZO [1] | 1.0 | 60 | 65 | [3] 3.91 | 133.9/418.20 | 1.664 | [1]208, 212, 231 |
| 4 | 0.40 | VAZO [1] | 5.0 | 60 | 65 | [4] 3.91 | 284.6/418.20 | 1.978 | 235, 239, 246 |
| 5 | 0.0745 | Benzoyl peroxide | 1.0 | 80 | 12 | 22.00 | ([5]) | | |
| 6 | 0.0745 | ___do___ | 5.0 | 80 | 12 | 31.00 | ([5]) | | |
| 7 | 0.0745 | ___do___ | 10.0 | 80 | 12 | 31.00 | ([5]) | | |
| 8 | 0.0745 | ___do___ | 0.5 | 60 | 60 | | ([6]) | | |
| 9 | 0.0745 | ___do___ | 1.0 | 60 | 60 | | ([6]) | | |
| 10 | 0.0745 | Lauryl peroxide | 0.5 | 60 | 60 | | ([6]) | | |
| 11 | 0.0745 | ___do___ | 1.0 | 60 | 60 | | ([6]) | | |
| 12 | 0.0745 | Cumene hydroperoxide | 1.0 | 120 | 60 | 59.00 | 35.9/418.20 | ([7]) | |
| 13 | 0.0745 | ___do___ | 5.0 | 120 | 60 | 64.00 | 63.70/418.20 | ([7]) | |
| 14 | 0.0745 | Dicumyl peroxide | 1.0 | 120 | 60 | 47.00 | 39.1/418.20 | ([8]) | |
| 15 | 0.0745 | ___do___ | 5.0 | 120 | 60 | 64.00 | 27.9/418.20 | ([8]) | |
| 16 | 0.3726 | T-butyl hydroperoxide | 1.0 | 125 | 96 | 31.60 | 44.1/418.20 | ([9]) | 25, 33, 45 |
| 17 | 0.3726 | ___do___ | 5.0 | 125 | 96 | 33.20 | 36.8/418.20 | ([10]) | 30, 39, 57 |

[1] VAZO = azobisisobutyronitrile.
[2] Very little reaction.
[3] Yellow brittle resin.
[4] White powder.
[5] Viscous yellow liquid.
[6] Very little or no reaction took place.
[7] Reddish oily liquid.
[8] Reddish brown oily liquid.
[9] Dark brown soft wax.
[10] Dark brown wax.

Cumene hydroperoxide and dicumyl peroxide at 120° C. produced reddish or reddish brown, liquid polymers, which also required isolation by vacuum distillation of the reaction mixture. Tertiary-butyl hydroperoxide at 125° C. produce a dark brown wax which had final melting points of 45 and 57° C., respectively.

EXAMPLE II

Suspension polymerization of 2-phenyl allyl alcohol was carried out in 350-ml. pressure bottles at 33% monomer concentration and 3% (based on monomer weight) polyvinyl alcohol as a suspending agent. In a typical run 53 grams of 2-phenyl allyl alcohol (0.4 mole) were added to the pressure bottle containing 107 grams of distilled water, 1.6 grams of polyvinyl alcohol and either 1% or 5% by weight alpha,alpha'-azobisisobutyronitrile as catalyst (based on weight of monomer). The pressure bottles were flushed with nitrogen before sealing. The reactions were carried out in a rotating launderometer at 60° C. for 65 hours. Methanol was added to the oil mixture (mixture of polymer and monomer) to precipitate the polymer which was dried in vacuo at 105–110° C. The results of the runs are summarized in Table II below.

Results similar to those of Example I, Table I, runs 3–4, can be obtained by employing the polymerization procedure of Example I but substituting the following catalysts for the alpha,alpha'-azobisisobutyronitrile catalyst.

Example III: alpha, alpha'-azodiisobutyramide.
Example IV: dihexyl-alpha, alpha'-azodiisobutyrate.

Solution polymerization of 2-phenyl allyl alcohol in benzene at 60° C. with azobisisobutyronitrile (VAZO) catalyst produced solid, resinous homopolymers of low molecular weight having final melting points below 200° C. as shown by Table III. Little or no polymerization of 2-phenyl allyl alcohol in benzene took place with lauroyl peroxide and with benzoyl peroxide as catalysts as shown by Table III.

TABLE II.—SUSPENSION HOMOPOLYMERIZATION OF 2-PHENYL ALLYL ALCOHOL IN WATER AT 33% MONOMER CONCENTRATION WITH 3% (BASED ON MONOMER WEIGHT) OF POLYVINYL ALCOHOL AS SUSPENDING AGENT

| | Moles 2PAA | Nature and concentration of initiator | Wt. percent | Reaction Temp., °C. | Reaction Time, hours | Polymer yield wt. percent | Hydroxyl value, meg./gm., found/ calcul. | M.W., V.P., diff. | Melting range, softening point, initial melting point, final melting point, °C. |
|---|---|---|---|---|---|---|---|---|---|
| Run No.: | | | | | | | | | |
| 1 | 0.40 | VAZO [1] | 1.0 | 60 | 65 | 5.59 | 93.20/418.20 | 1,176 | 190, 194, 213 |
| 2 | 0.40 | VAZO [1] | 5.0 | 60 | 65 | 6.89 | 234.80/418.20 | 1,013 | 122, 136, 157 |

[1] VAZO = azobisisobutyronitrile.

TABLE III.—SOLUTION HOMOPOLYMERIZATION OF 2-PHENYL ALLYL ALCOHOL IN BENZENE AT 60° C.

| | Moles 2PAA | Monomer conc., percent | Nature and concentration of initiator | Wt. percent | Reaction time, hours | Polymer yield, wt. percent | Hydroxyl value meg./gm., found/ calcul. | M.W., V.P., diff. | Melting range, softening point, initial melting point, final melting point, °C. |
|---|---|---|---|---|---|---|---|---|---|
| Run No.: | | | | | | | | | |
| 1 | 0.40 | 33.0 | VAZO [1] | 1.0 | 65 | 3.72 | 240.70/418.20 | 571 | 114, 125, 140 |
| 2 | 0.40 | 33.0 | VAZO [1] | 5.0 | 65 | 3.54 | 266.70/418.20 | 636 | 124, 139, 157 |
| 3 | 0.0745 | 10.0 | Benzoyl peroxide | 0.5 | 60 | [2] | | | |
| 4 | 0.0745 | 10.0 | do | 1.0 | 60 | [2] | | | |
| 5 | 0.0745 | 10.0 | Lauroyl peroxide | 0.5 | 60 | [2] | | | |
| 6 | 0.0745 | 10.0 | do | 1.0 | 60 | [2] | | | |

[1] VAZO = azobisisobutyronitrile.
[2] Little or no polymer formed.
NOTE.—Wt. percent of initiator is based on monomer.
Monomer concentration is based on weight of benzene plus monomer.

It is claimed:
1. A process for producing a solid homopolymer of 2-phenyl allyl alcohol which consists essentially of polymerizing 2-phenyl allyl alcohol in bulk or dispersed in water at a temperature of about 40 to 70° C. in the presence of a catalytic amount of an azo catalyst of the structure

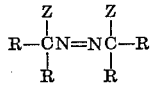

wherein R is aliphatic hydrocarbon of up to about 11 carbon atoms with the total carbon atoms on each side of the azo group being about 4 to 11, and Z is selected from

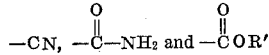

wherein R' is lower alkyl, and obtaining as the resulting product a solid homopolymer of 2-phenyl allyl alcohol having a final melting point of about 200 to 250° C. and a molecular weight of at least about 1100.

2. The process of claim 1 wherein R is alkyl and Z is —CN.

3. The process of claim 1 wherein the catalyst is alpha, alpha'-azobisisobutyronitrile.

4. The process of claim 3 wherein the polymerization is conducted at a temperature of about 50 to 65° C.

5. The process of claim 1 wherein 2-phenyl allyl alcohol is polymerized in bulk at a temperature of about 50 to 65° C. and the catalyst is alpha, alpha'-azobisisobutyronitrile.

6. The process of claim 1 wherein 2-phenyl allyl alcohol is polymerized at a temperature of 50 to 65° C. dispersed in water with a small amount of a suspending agent and the catalyst is alpha, alpha'-azobisisobutyronitrile in amount of about 1% to less than 5% by weight of the 2-phenyl allyl alcohol.

References Cited

UNITED STATES PATENTS 2,537,622   1/1951   Butler.
3,306,888   2/1967   Mortimer.

JOSEPH L. SCHOFER, Primary Examiner
S. M. LEVIN, Assistant Examiner

UNITED STATES PATENT OFFICE
CERTIFICATE OF CORRECTION

Patent No. 3,497,486     Dated February 24, 1970

Inventor(s) Marc O. Thienot and Joseph Verdol

It is certified that error appears in the above-identified patent and that said Letters Patent are hereby corrected as shown below:

Table I, the 3rd column, under Run No. 10, delete "Lauryl" and insert therefor--Lauroyl--.

Table I, the 9th column, under Run No. 3, delete "1.664" and insert therefor--1,664--.

Table I, the 9th column, under Run No. 4, delete "1.978" and insert therefor--1,978--.

SIGNED AND SEALED

FEB 23 1971

(SEAL)
Attest:

Edward M. Fletcher, Jr.
Attesting Officer

WILLIAM E. SCHUYLER, JR.
Commissioner of Patents